June 5, 1945.　　　T. S. BRISKIN ET AL　　　2,377,750
MOTION PICTURE CAMERA
Filed Dec. 8, 1943　　　3 Sheets-Sheet 1
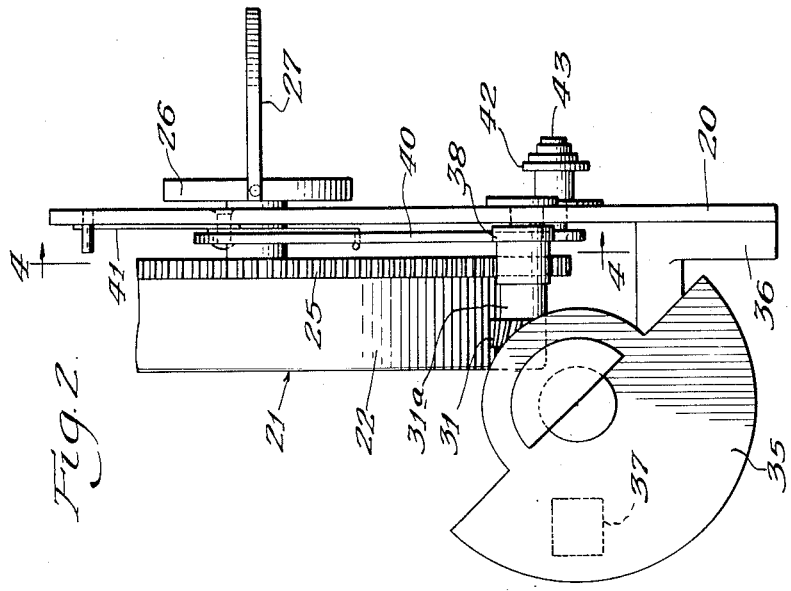
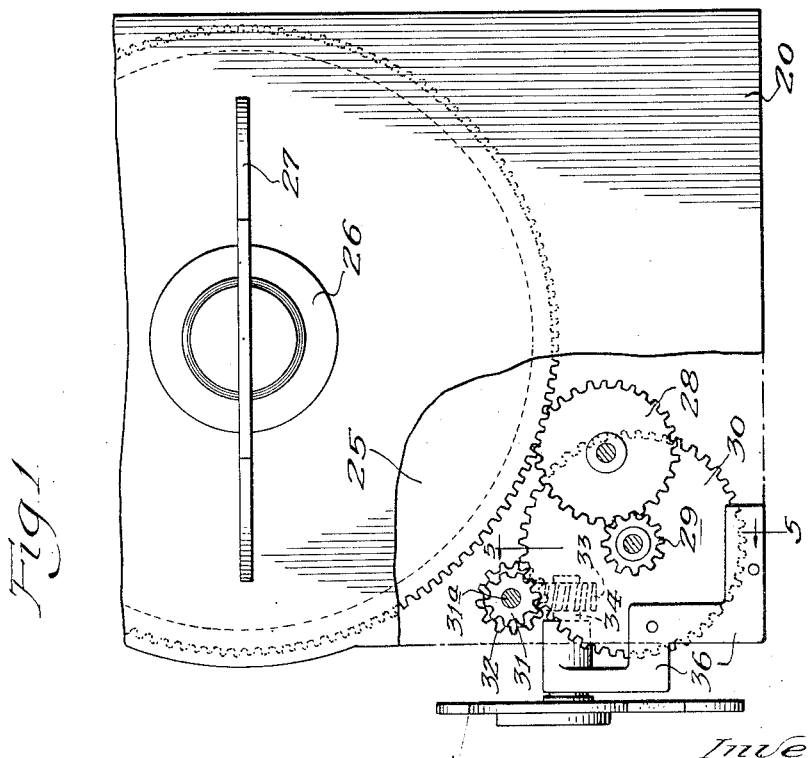
Inventors:
Theodore S. Briskin
Joseph Golick
By: Zabel, Carlson, Fittbaugh & Wells
Attorneys

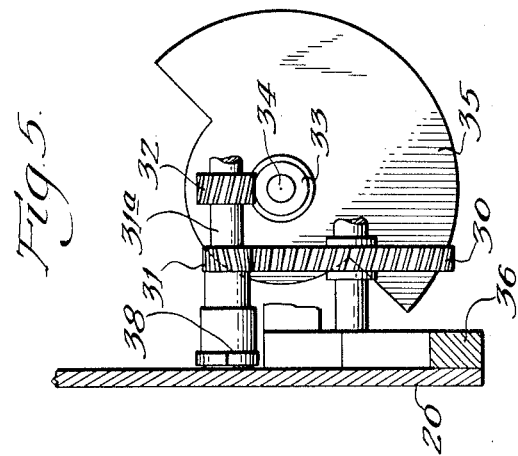
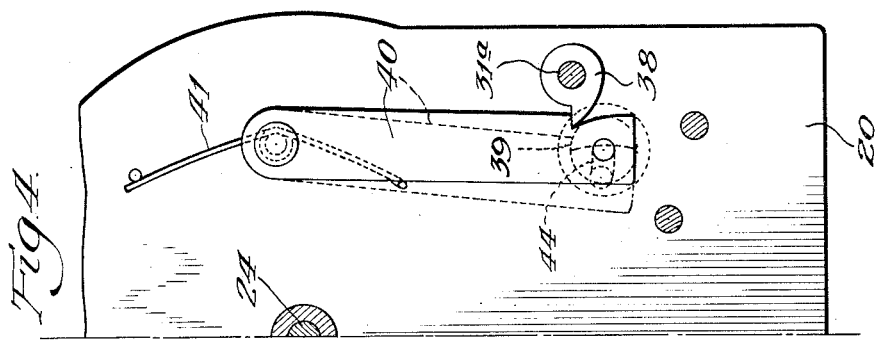
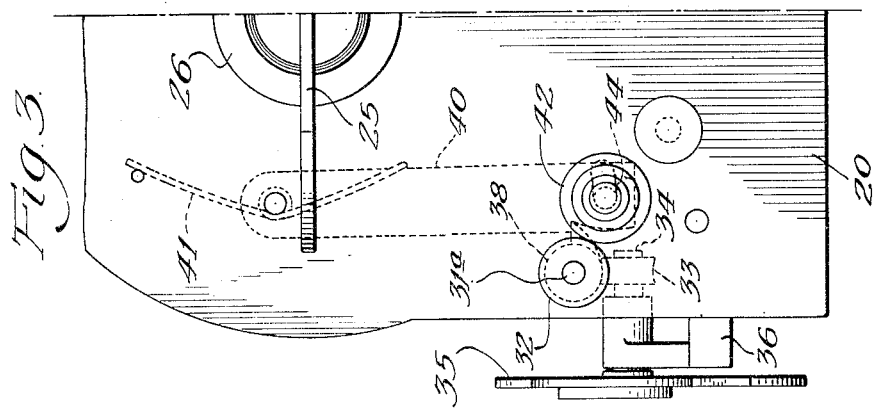

June 5, 1945. T. S. BRISKIN ET AL 2,377,750
MOTION PICTURE CAMERA
Filed Dec. 8, 1943 3 Sheets-Sheet 3
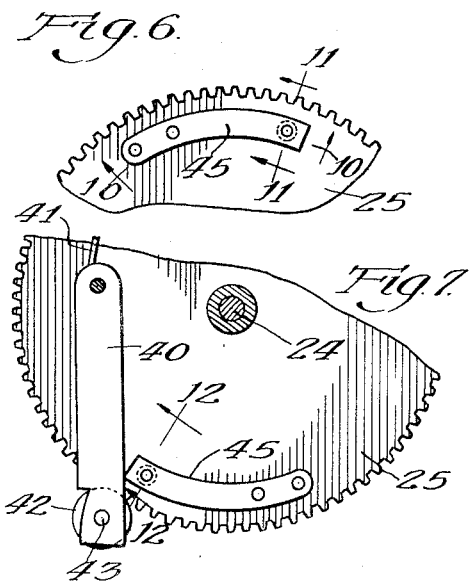
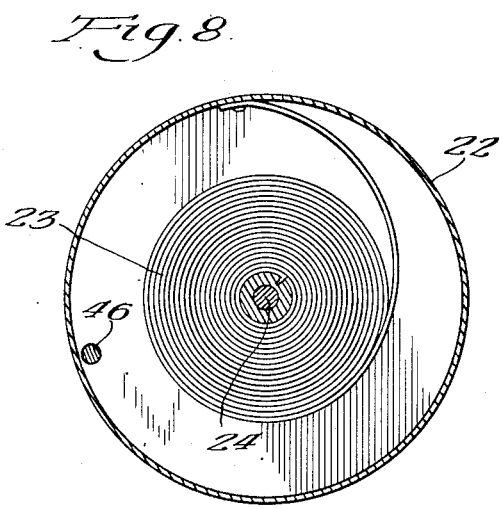
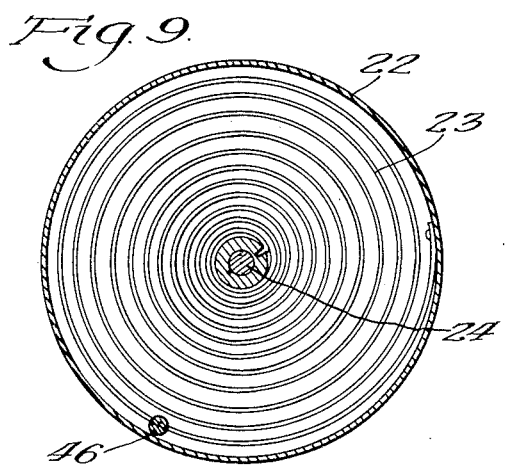
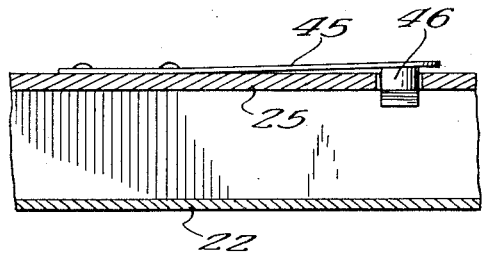
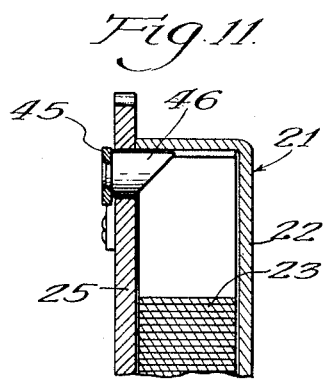
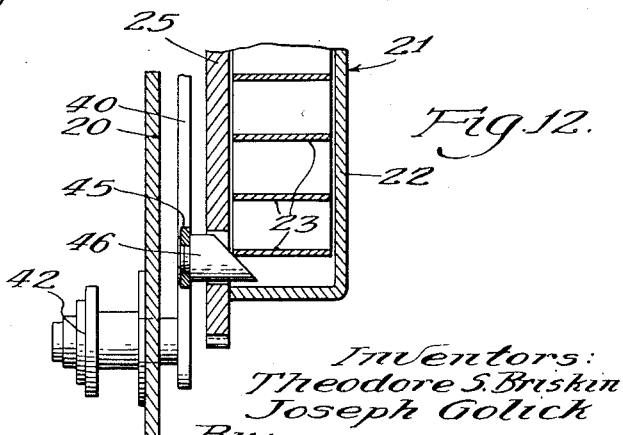

Patented June 5, 1945

2,377,750

UNITED STATES PATENT OFFICE 2,377,750

MOTION PICTURE CAMERA

Theodore S. Briskin and Joseph Golick, Chicago, Ill., assignors to Revere Camera Company, Chicago, Ill., a corporation of Delaware Application December 8, 1943, Serial No. 513,372

9 Claims. (Cl. 88—18)

This invention relates to motion picture cameras, and particularly to those driven by spring motors. When a spring motor is used for driving a mechanism offering any substantial resistance, the speed of driving is considerably cut down during a substantial period before the energy of the motor is completely used up. It is one of the objects of this invention to provide improved means which shall act automatically for stopping the operation of a camera motor before there has been any substantial reduction in its speed of operation, whereby the user may be protected positively against the possibility of having a series of pictures spoiled by reason of defective timing. It is one of the objects of our invention to provide an improved arrangement of the means for stopping the rotation of the motor so that the motor is always stopped with the camera shutter in effective closure position so as to insure that the film shall be fully protected at all times against being affected by an unrestricted admission of light. To this end, it is one of the objects of the invention to provide improved means for stopping the camera motor by controlling mechanism acting directly on the shutter or on the driving means for the shutter closely adjacent thereto.

In the preferred embodiment of the invention, we have provided means actuated by engagement with the motor spring when such spring reaches a predetermined degree of unwinding adapted to move the starting lever of the camera to its normal stop position, the arrangement being such that this automatic action shall normally be effected even though the starting lever is being held by the operator out of such stop position.

It is another object of this invention to improve devices of this type in sundry details hereinafter pointed out. The preferred means by which we have accomplished our several objects are illustrated in the accompanying drawings in which—

Fig. 1 is a face view of a portion of a camera casing, with certain parts omitted and with a part of the framework broken away for showing more clearly the train of gearing from the spring motor to the shutter;

Fig. 2 is a view of the parts shown in Fig. 1 as seen from the left in said figure;

Fig. 3 is a view similar to a portion of Fig. 1 but with some parts added and with other parts omitted;

Fig. 4 is a vertical sectional view taken substantially at the line 4—4 of Fig. 2, and showing a changed position of certain of the parts;

Fig. 5 is a vertical sectional view taken substantially at the line 5—5 of Fig. 1;

Fig. 6 is a fragmentary view showing a portion of the large gear forming a part of the housing of the spring motor, with a movable lug in normal position thereon;

Fig. 7 is a fragmentary view of a portion of said large gear at a later stage in the operation of the motor, with the movable lug in changed position so as to have operative engagement with a lever mounted adjacent thereto;

Fig. 8 is a view of the motor spring in fully wound condition in its housing, with the gear forming a portion of the housing removed;

Fig. 9 is a view similar to Fig. 8, with the tension of the motor substantially cut down but before there has been any substantial reduction in the speed of operation of the motor; and Figs. 10, 11 and 12 are sectional views taken on a substantially enlarged scale on the line 10—10, the line 11—11, and the line 12—12, respectively, of Figs. 6 and 7.

Referring now to the several figures of the drawings, in which corresponding parts are indicated by the same reference characters, 20 indicates a heavy plate forming a portion of the framework of a camera. At one face of the plate 20 a spring motor 21 is mounted, comprising a housing member 22, a coiled flat spring 23 mounted on an arbor 24 in said housing member, with the inner end of the spring connected with the arbor, and the outer end of the spring connected with the housing, and a large gear 25 fixedly connected with said housing member in position to close the face of the housing member about the spring. The arbor 24 is provided with a plate 26 fixedly mounted thereon outside of the housing, with a finger-piece 27 pivotally mounted thereon for winding the motor. Suitable means of any approved type not shown is provided for preventing rotation of the arbor in the reverse direction, as is usual in spring motors of this type. The arrangement is such that the spring motor is adapted to drive the housing member 22 and the gear 25 in clockwise direction in Fig. 1.

As is best shown in Fig. 1, the large gear 25 meshes with a smaller gear 28 which in turn meshes with a pinion 29 for driving a gear 30. The gear 30 meshes with a pinion 31 carried by a shaft 31a for driving a pinion 32 mounted on said shaft, which pinion 32 meshes with a pinion 33 mounted on a rotatably mounted shaft 34 carrying a shutter 35. In the arrangement shown, the shaft 34 is journaled in a bracket 36 mounted on the frame plate 20. By this arrangement the shutter may be driven continuously by the spring motor so as intermittently to shut off the passage of light through an exposure opening in the camera, as is well understood in the art. In Fig. 2 the exposure opening is represented diagrammatically by the dotted line rectangular figure 37.

Manually operable means is provided for controlling the operation of the spring motor for driving the shutter 35. This means comprises a lug 38 fixedly mounted on the shaft 31a in position to engage a shoulder 39 in the edge of a lever 40 pivotally mounted on the face of the plate 20 as is best shown in Fig. 4. A spring 41 of any suitable type is provided for normally holding the lever 40 swung into position for engagement by the lug 38 as shown in solid lines in said Fig. 4. A handle 42 is mounted on the lever 40 by means of a pin 43 extending through a slot 44 in the plate 20 (see Fig. 3), the arrangement being such that the lever 40 can be conveniently moved into and out of position for engagement with the lug 38, the movement of the lever 40 toward the right in Fig. 3 out of operative position being effected against the action of the spring 41. It will be understood that when the lever 40 stands in the position as shown in solid lines in Fig. 4, the shaft 31a and the shutter 35 are held stationary. When, however, the lever 40 is moved towards the left to the position as shown in dotted lines in said Fig. 4, the shaft 31a and the shutter 35 are free to rotate under the influence of the spring motor. The operator is thus enabled very readily to control the operation of the camera, the handle 42 being in convenient position for manipulation manually by the operator without any movement of the hand as a whole. For effecting the automatic termination of the operation of the motor when the tension of the motor spring has been greatly reduced but before the speed of operation of the motor has been substantially cut down, I have provided means for giving the lever 40 a movement from its dotted line position as shown in Fig. 4 to its solid line position, such movement of the lever being effected normally against the force of the manual pressure on the lever. This means comprises a movable lug on the gear 25 adapted to be shifted into and out of position for engagement with the lever 40. In the preferred construction, the movable lug is in the form of a flat spring 45 fixedly mounted at one end on the face of the gear 25, having a pin 46 mounted at its opposite end, such pin 46 having a beveled end face pressed toward the spring 23. When the spring 23 is wound tightly, it stands at a considerablye distance from the pin 46, and the flat spring 45 stands then in its normal position close to the face of the gear 25 as shown in Fig. 10. When, however, the tension of the motor spring has been substantially reduced, so as to permit the motor spring to become spread substantially within the housing 22, as shown in Fig. 12, the outer ply of the motor spring is brought into camming engagement with the beveled end of said pin 46 so as to force the end of the flat spring 45 away from the gear into position for engaging the lever 40, as shown in said Fig. 12. When such engagement takes place between the flat spring 45 and the lever 40, a very substantial pressure is applied to the lever for moving it toward the left in Fig. 7 (toward the right in Fig. 4) so as to be engaged by the lug 38 for stopping the rotation of the shaft 31a and thus stopping the operation of the motor. The position of the lug 38 on the shaft 31a and with respect to the shutter 35 is such that the shaft 31a is always brought to rest by the lug 38 with the shutter in its operative closure position with respect to the exposure opening 37, as shown in Fig. 2.

By the use of our improved mechanism, after the spring motor has given the usual film a great number of intermittent movements past the exposure opening of the camera in timed relation to the movements of the shutter, and when the spring motor is about to reach a completely run down condition so as to require rewinding, the spring 23 in its spread condition is brought into engagement with the pin 46 so as to begin to apply pressure on the flat spring lug 45 through said pin. During all of the normal operation of the motor up to this time, the movable lug 45 has been moving past the lever 40 without engaging it. The flat spring 45, however, is finally displaced sufficiently for engaging the lever 40, such engagement taking place while the motor is still driving at substantially its normal full speed, so that a very considerable pressure is applied to the lever 40 so as to move the lever against the force of the manual pressure which has been holding it in position for permitting the operation of the motor. The operation of the motor is thus terminated, with the shutter always in its effective closure position at such stoppage of the motor, and this result is effected always before the speed of operation of the motor has been substantially cut down from normal.

While we prefer to employ the form and arrangement of parts as shown in our drawings and as above described, the invention is not to be limited thereto, except so far as such form and arrangement are specifically claimed, it being understood that changes might well be made in the form and arrangement of the parts without departing from the spirit of our invention.

We claim:

1. A moving picture camera, comprising in combination a spring motor, means actuated by said motor for giving a film intermittent movements past an exposure opening in timed relation to the movements of a shutter, manually operable means adapted by movements alternatively in opposite directions to start and stop said motor, and means actuated by the motor adapted automatically before the tension of the motor spring has been completely relieved to give said manually operable means a movement by power for stopping the operation of the motor.

2. A moving picture camera, comprising in combination a spring motor, means actuated by said motor for giving a film intermittent movements past an exposure opening in timed relation to the movements of a shutter, manually operable means adapted by movements alternatively in opposite directions to start and stop said motor, and a member moved by operative engagement with the motor spring as it spreads in unwinding adapted automatically to force said manually operable means to its motor stopping position before the tension of the motor spring has been completely relieved, whereby the operation of the motor is terminated before the speed of operation has been substantially cut down.

3. In a moving picture camera, the combination of a spring motor, means actuated by said motor for giving a film intermittent movements past an exposure opening in timed relation to the movements of a shutter, means comprising a lever adapted by strokes alternatively in opposite directions to start and stop said motor, a member adapted to be given by said motor a plurality of movements past said lever after each rewinding of the motor, and means for changing the position of said member as the tension of the motor spring is cut down serving to bring the member finally into operative engagement with the lever for giving it a stroke in the direction for stopping the motor before the speed of operation of the motor has been substantially reduced.

4. In a moving picture camera, the combination of a spring motor, means actuated by said motor for giving a film intermittent movements past an exposure opening, a shaft rotatably mounted in position and connected with the motor for rotation thereby, a shutter having an operative connection with said shaft so as to be effective for closing said exposure opening during a portion of each rotation of the shaft, a lug on said shaft, a lever movably mounted in position adapted when moved toward said shaft to engage said lug for stopping the rotation of the shaft and thus stopping the operation of the motor, said lug being so positioned on the shaft as to stop the rotation of the shaft at a point at which the shutter is in closure position, and spring means adapted normally to press said lever into position for engaging said lug and stopping the motor.

5. In a moving picture camera, the combination of a spring motor, means actuated by said motor for giving a film intermittent movements past an exposure opening, a shaft rotatably mounted in position and connected with the motor for rotation thereby, a shutter having an operative connection with said shaft so as to be effective for closing said exposure opening during a portion of each rotation of the shaft, a lug on said shaft, a lever movably mounted in position adapted when moved toward said shaft to engage said lug for stopping the rotation of the shaft and thus stopping the operation of the motor, said lug being so positioned on the shaft as to stop the rotation of the shaft in each instance at a point at which the shutter is in closure position, and means actuated by the motor by operative engagement with the motor spring as it spreads in unwinding adapted automatically at a predetermined point in the unwinding of the spring to give said lever a movement by power in the direction for stopping the operation of the motor.

6. In a moving picture camera, the combination of a spring motor, means actuated by said motor for giving a film intermittent movements past an exposure opening, a shaft rotatably mounted in position and connected with the motor for rotation thereby, a shutter having an operative connection with said shaft so as to be effective for closing said exposure opening during a portion of each rotation of the shaft, a lug on said shaft, a lever movably mounted in position adapted when moved toward said shaft to engage said lug for stopping the rotation of the shaft and thus stopping the operation of the motor, said lug being so positioned on the shaft as to stop the rotation of the shaft in each instance at a point at which the shutter is in closure position, a movable lug carried around by the motor in close proximity to said lever but normally in position to avoid engagement therewith, means actuated by the motor by operative engagement with the motor spring as it spreads in unwinding, adapted to change the position of said movable lug so that at a predetermined point in the unwinding of the motor spring said movable lug is brought into position to engage said lever for giving it a movement by power in the direction for stopping the operation of the motor.

7. In a moving picture camera, the combination of a spring motor, means actuated by said motor for giving a film intermittent movements past an exposure opening, a shaft rotatably mounted in position and connected with the motor for rotation thereby, a shutter having an operative connection with said shaft so as to be effective for closing said exposure opening during a portion of each rotation of the shaft, a lug on said shaft, a lever movably mounted in position adapted when moved toward said shaft to engage said lug for stopping the rotation of the shaft and thus stopping the operation of the motor, said lug being so positioned on the shaft as to stop the rotation of the shaft in each instance at a point at which the shutter is in closure position, a movable lug carried around by the motor in close proximity to said lever but normally in position to avoid engagement therewith, and a cam member movable with said movable lug and normally standing in position for engagement with the motor spring when said motor spring has unwound to a predetermined extent but before the speed of operation of the motor has been substantially cut down for shifting said movable lug into position to engage said lever and to move it for stopping the operation of the motor.

8. In a moving picture camera, the combination of a spring motor, means actuated by said motor for giving a film intermittent movements past an exposure opening, a shaft rotatably mounted in position and connected with the motor for rotation thereby, a shutter having an operative connection with said shaft so as to be effective for closing said exposure opening during a portion of each rotation of the shaft, a lug on said shaft, a lever movably mounted in position adapted when moved toward said shaft to engage said lug for stopping the rotation of the shaft and thus stopping the operation of the motor, said lug being so positioned on the shaft as to stop the rotation of the shaft in each instance at a point at which the shutter is in closure position, a flat spring carried around by the motor with one end portion free to move and normally in position to come into close proximity to the lever but to avoid engagement therewith, and a cam member mounted on said flat spring having an obliquely positioned face disposed toward the motor spring adapted by a camming engagement with the motor spring when it has spread in unwinding to displace said flat spring into position to engage said lever so as to give the lever an operative stroke for stopping the operation of the motor.

9. In a moving picture camera, the combination of a spring motor comprising a large gear through which power is applied from the motor, means actuated by said motor for giving a film intermittent movements past an exposure opening, a shaft rotatably mounted in position and connected with the motor for rotation thereby, a shutter having an operative connection with said shaft so as to be effective for closing said exposure opening during a portion of each rotation of the shaft, a lug on said shaft, a lever movably mounted in position adapted when moved toward said shaft to engage said lug for stopping the rotation of the shaft and thus stopping the operation of the motor, said lug being so positioned on the shaft as to stop the rotation of the shaft at a point at which the shutter is in closure position, a flat spring mounted at one end portion on one face of said large gear with its other end portion free to move toward and from the gear with said free end portion of the flat spring normally in position to come into close proximity to the lever but to avoid engagement therewith, and a cam member mounted on said flat spring having an obliquely positioned face disposed toward the motor spring adapted by a camming engagement with the motor spring, when it has spread in unwinding to a predetermined extent but before the speed of operation of the motor has been substantially cut down, to displace said flat spring into position to engage said lever so as to give the lever an operative stroke for stopping the operation of the motor.

THEODORE S. BRISKIN.
JOSEPH GOLICK.